United States Patent
Hundegger

(10) Patent No.: US 7,661,451 B2
(45) Date of Patent: Feb. 16, 2010

(54) METHOD AND MACHINING INSTALLATION FOR THE MACHINING OF WOOD WORKPIECES

(76) Inventor: Hans Hundegger, Kemptener Strasse 1, Hawangen (DE) 87749

( * ) Notice: Subject to any disclaimer, the term of this patent is extended or adjusted under 35 U.S.C. 154(b) by 270 days.

(21) Appl. No.: 10/728,773

(22) Filed: Dec. 8, 2003

(65) Prior Publication Data

US 2005/0121109 A1 Jun. 9, 2005

(51) Int. Cl.
*B27H 1/00* (2006.01)
*B27M 1/00* (2006.01)

(52) U.S. Cl. .................. 144/360; 144/365; 144/367

(58) Field of Classification Search ............ 144/365, 144/367, 250.12, 250.13, 35.1, 242.1, 243, 144/1.1, 2.1, 3.1, 360, 39, 41, 46, 48, 35.2, 144/48.1, 248.2, 248.5; 29/26 A, 564; 409/159, 409/161

See application file for complete search history.

(56) References Cited

U.S. PATENT DOCUMENTS

| | | | | |
|---|---|---|---|---|
| 3,223,131 A * | 12/1965 | Hovermale | ............... | 144/3.1 |
| 3,241,583 A * | 3/1966 | Andersen | ............... | 144/29 |
| 3,538,966 A * | 11/1970 | Collins | ............... | 144/162.1 |
| 3,833,033 A * | 9/1974 | Hurn | ............... | 144/402 |
| 4,068,695 A * | 1/1978 | Seaman | ............... | 144/335 |
| 4,098,310 A * | 7/1978 | Sanford et al. | ............... | 144/402 |
| 4,106,538 A * | 8/1978 | Sigfridsson et al. | ............... | 144/376 |
| 4,210,184 A * | 7/1980 | McGriff | ............... | 144/364 |
| 4,378,035 A * | 3/1983 | Chisum | ............... | 144/1.1 |
| 4,441,537 A * | 4/1984 | Vartiainen | ............... | 144/357 |
| 4,881,584 A * | 11/1989 | Wislocker et al. | ............... | 144/39 |
| 4,907,632 A * | 3/1990 | Reuter | ............... | 144/356 |
| 4,938,263 A * | 7/1990 | Wrightman | ............... | 144/422 |
| 5,373,878 A * | 12/1994 | Walker | ............... | 144/250.16 |
| 5,400,842 A * | 3/1995 | Brisson | ............... | 144/398 |
| 5,447,186 A * | 9/1995 | Achard et al. | ............... | 144/357 |
| 6,039,097 A * | 3/2000 | Kennedy et al. | ............... | 144/357 |
| 6,062,281 A * | 5/2000 | Dockter et al. | ............... | 144/357 |
| 6,196,283 B1 * | 3/2001 | Hundegger | ............... | 144/3.1 |
| 6,213,176 B1 * | 4/2001 | Wolf et al. | ............... | 144/242.1 |
| 6,640,855 B2 * | 11/2003 | Giles | ............... | 144/357 |

FOREIGN PATENT DOCUMENTS

| | | | |
|---|---|---|---|
| DE | 2518145 | | 11/1976 |
| DE | 3872254 G | * | 7/1992 |
| DE | 19926834 A1 | | 12/2000 |
| EP | 164063 A2 | * | 12/1985 |
| EP | 319032 A2 | * | 6/1989 |
| EP | 391945 B1 | * | 6/1992 |
| EP | 0561227 A1 | | 9/1993 |
| WO | WO8905709 | * | 6/1989 |

* cited by examiner

*Primary Examiner*—Bena Miller
(74) *Attorney, Agent, or Firm*—Jacobson Holman PLLC

(57) ABSTRACT

A method as well as a bonding installation for machining of wood workpieces. At least one machining aggregate is provided where in the supplying and discharge region one conveying system each is arranged. Besides machining of the front end region by the machining aggregate also other machinings are carried out on the wood workpiece.

9 Claims, 2 Drawing Sheets

METHOD AND MACHINING INSTALLATION FOR THE MACHINING OF WOOD WORKPIECES

Figure 1:
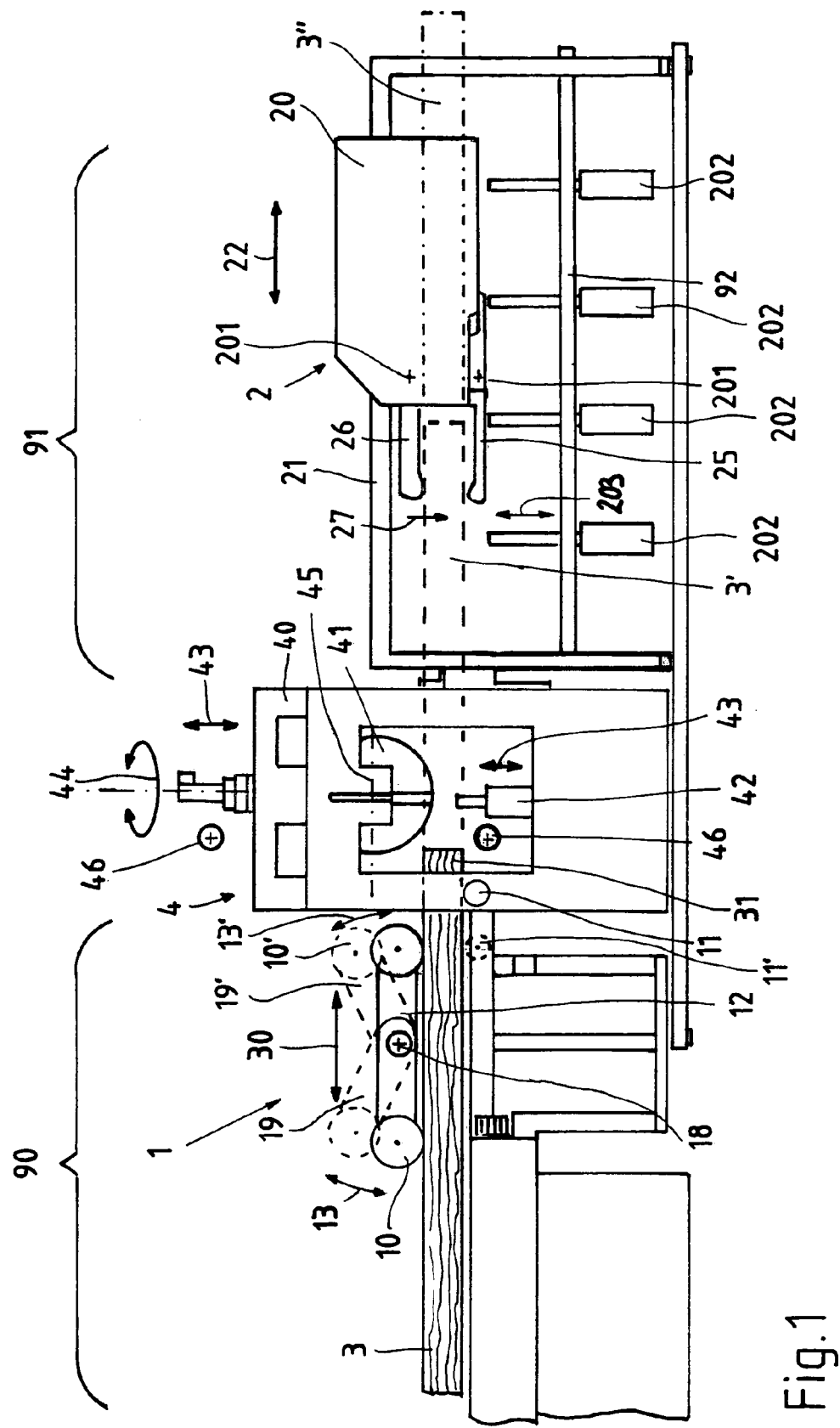

The invention refers to a method as well as a machining installation for the machining of wood workpieces, squared timbers, boards and the like. Here in the machining installation at least one machining aggregate is provided, in the feeding and discharge region of which one conveying system each for the wood workpiece is provided. If necessary this conveying system also has a positioning system for wood workpiece.

BACKGROUND OF THE INVENTION

From the European patent specification 561 227 a bond machine for machining squared timbers or the like is known. Here several machining aggregates are proposed one behind the other. A first conveying system serves for the approaching of a wood wokpiece to the first machining aggregate, for example a cross-cut saw or a trim saw. After this first machining aggregate has machined on the front end of the wood workpiece, for example has clipped it, the wood workpiece is taken over by a second conveying system and passed to the other machining aggregates which are able to carry out very different machinings. The first machining aggregate is now free again by that in order to machine on a following wood workpiece.

The different machining steps, that are sawing, drilling, milling and so on are here provided in respective separate machining aggregates. This leads to a corresponding conveying way between the different machining aggregates, and the bond installation has, according to the state of the art, a corresponding length.

BRIEF SUMMARY OF THE INVENTION

The present invention has the object to improve the state of the art in that way that less positioning place is needed when the machining possibilities are the same.

The problem is solved by means of the method according to the invention described in the following.

The invention suggests a method for machining wood workpieces, at least one machining aggregate being provided, in the feeding and discharging region of which one conveying system each is provided for the wood workpiece, and the machining aggregate carries out, if necessary besides a machining of the front end region of the wood workpiece, also other machinings on the wood workpiece. The achievement according to the invention is in particular the fact that the machining aggregate is used not only for one machining step, but the machining aggregate is used for a plurality of machining steps.

In the simplest embodiment of the invention it is provided that only a saw is used as machining aggregate for example.

The saw or any another tool cannot only machine on the front end of the workpiece which is located in the direction of conveying, but is used also for each further machining along the wood workpiece. The arrangement of the two devices of conveying allows a safe, that is an exactly positioned, machining as well as a very quick machining. Namely, if a finished workpiece is discharged by the second conveying system, already the next one following can be fed. Here the invention allows in its simplest variant an embodiment as machining installation or as sawing installation with a saw which can be controlled correspondingly convenient and also intelligently. Instead of a saw in this machining installation of course any other desired tool can be used. The machining aggregate here can, however, be equipped accordingly without any problems and thus also the possibilities of the machining in a machining installation according to the invention have to be increased accordingly. The invention also allows that with such a machining installation which is equipped accordingly even extensive bond machinings are possible in the way they are carried out in bond machines according to the state of the art.

With the invention not only the machining is accelerated (a following wood workpiece is already fed while the finished workpiece is being discharged), but the machining installation according to the invention is also smaller then comparative installations. In particular when a plurality of machining tools are combined in the machining aggregate in a narrow space the corresponding constructive length of such a machining installation is saved.

The invention proposes that the wood workpiece, after, if necessary, its front end region has been machined on (with regard to the direction from feeding to discharging) is machined on by the same machining aggregate at other positions along the wood workpiece. Here the invention does not define which is the first machining step to be carried out. It is, for example, possible to provide a saw as a tool in the machining aggregate which carries out after the first cut further subdividings exactly. For an exact arrangement of the respective machinings the positioning system of the conveying system is responsible.

In another variant of the invention instead of a saw blade of course a cutting tool, for example a planing tool, a drill or a milling cutter, can be provided which is used also at any points along the wood workpiece.

The method according to the invention is preferably realized in a machining installation also according to the invention. Such a machining installation serves for machining of wood workpieces, squared timbers, boards and the like, in a feeding region a first conveying system for the wood workpiece being provided, which approaches fed wood workpieces to a machining aggregate, and on the discharge side of the machining aggregate a second conveying system being provided, and the machining aggregate, if necessary, machines on the front end region of the wood workpiece. The invention is characterized by the fact that the first and/or second conveying system conveys the wood workpiece for further machinings of the machining aggregate. According to the invention it is planned that an overlapping of the machining and the conveying movement is carried out. By means of that it is basically possible to carry paths, respectively to use also the axis of movement of the workpiece during the machining. This becomes even more comfortable and varied by another moved axis with the workpieces.

The machining installation according to the invention allows several variants how to position the wood workpiece in the machining aggregate for a further machining. For that purpose, either the first conveying system which is arranged on the feeding side, is used. Or, alternatively, it is possible to use the second conveying system located on the discharge side. Also a common use of both conveying systems, for example for a common guide of the wood workpiece is an advantage (for example at the respective ends).

In the sense of the invention it is not really decisive that in each case always a machining of the front end region of the wood workpiece has to be carried out. This may be convenient, but it is not essential as the invention is flexible and, of course, even carries out only a machining of the wood workpiece in the center region. However, as the invention is basically sufficiently flexible to carry out even a classical clipping function the invention comprises a large range of applications.

As far as in the connection with this invention only a wood workpiece is mentioned generally this should also comprise naturally squared timbers, boards or other wood workpieces. The invention is also able, for example, to machine on a stack of wood boards at the same time, that is simultaneously. The used conveying systems, this will be described later on, are able to safely and exactly convey such wood workpieces which are not connected to each other in any other way. Thus wood workpieces are not to be understood only as single parts but also stacks of wood workpieces.

In particular the invention aims at only one machining aggregate in the machining installation. This does, however, not mean that the invention is not realized in machining installations with several machining aggregates. In such an application case it has to be taken into consideration that in particular also the first machining aggregate does not only carry out a machining of the front end region of the wood workpiece, but it can also carry out other machinings. In this respect the performance according to the invention is used with the first machining aggregate and thus the advantage according to the invention is reached.

The special advantage of the invention is emphasized of course if only one machining aggregate is used which is, also a part of the invention, also, if necessary, equipped also complex, in order to allow a number of different machinings.

In a preferred embodiment of the invention it is provided that the positioning system, respectively a measuring equipment connected with it, is normalized during the first machining of the wood workpiece by the machining aggregate, for example the clipping, to the respective position of the conveying system to the wood workpiece. By means of this development according to the invention the exact position of the conveying system, that means its working point on the wood workpiece, is not important. The machining installation, respectively the measuring equipment of the positioning system of the conveying system, knows the respective position of the conveying system with regard to the location of the first machining, making an exact further positioning of the wood workpiece possible without any problems. The normalization here acts as initialization of the measuring equipment in order to make sure that a corespondingly exact machining is carried out. This indexing or initialization does not require the use of a clipping cut at the front end of the wood workpiece. This initialization is carried out, for example, optically (light barrier or light curtain), mechanically or electrically (respectively capacitively) in the same way and thus sets the measuring equipment to zero for the normalization. The indexing, respectively the initialization, requires of course that the wood workpiece be recognized first of all, respectively collected. If necessary simultaneously not only the positioning systems of both conveying systems are normalized but they are also synchronized to each other.

Alternatively it is suggested that the conveying system conveys the wood workpiece before a machining towards a stopper and thus the respective position of the conveying system to the wood workpiece is normalized. In this case the control knows to which the method according to the invention is applied, respectively the machining installation itself the position of the stopper with regard to the location of the machining point and thus carries out a normalization, respectively an initialization. This procedure as well leads to an exact and reliable machining.

It is convenient if first of all the first conveying system conveys the wood workpiece for the machining to the machining aggregate, respectively the stopper, and if there the initialization, respectively the normalization, starts. As the machining installations are designed in such a way that both conveying systems are normalized to each other accordingly, in particular when a passing of the wood workpiece from the first to the second conveying system is carried out, it is also advantageous if a corresponding initialization is also carried out for the conveying system which is not directly involved with the approach of the wood workpiece.

The invention provides that the wood workpiece is moved even while it is machined on. By means of that it is basically possible also to carry machining paths, that means to include more complex machinings, for example along the longitudinal extension of the wood workpiece. Such a procedure is not known from the cross-cut saws according to the prior art.

The path carrying is carried out, for example, by the fact that the wood workpiece is moved only by the first or the second or by both conveying systems together.

According to the invention it is suggested that at least one conveying system has a positioning system which co-operates with a measuring equipment, making an exact positioning of the wood workpiece in the machining aggregate possible. In the simplest embodiment it is proposed here that at least the second conveying system has a corresponding positioning system and thus takes over the positioning of the wood workpiece in the machining aggregate. In such a simple embodiment a corresponding positioning system in the first conveying system which takes over the approaching of the workpiece in the feeding region, is not necessary. It is more convenient, however, that both conveying systems have a corresponding positioning system in order to allow by means of that a correspondingly flexible machining.

It is an advantage if the conveying system has a non-positively and/or positively acting coupling unit, that means that the conveying system is connected with the wood workpiece for conveying, respectively positioning, purposes. It is convenient if there is a sufficiently safe connection of the coupling unit with the wood workpiece in order to safely avoid a mismatch of the position of the wood workpiece to the coupling unit. Such a mismatch, for example a slippage, would influence the dimensional accuracy accordingly. A sufficient dimensional accuracy is guaranteed by coupling units which act correspondingly positively and/or non-positively, even only positively or non-positively acting coupling units being sufficient. Naturally it is possible to use also a positive connection combined with a non-positive effect.

As coupling unit often a positioning carriage which can traverse on a guide line is used, the positioning carriage having corresponding elements for the connection with the wood workpiece.

In a variant according to the invention it is provided that the first conveying system is formed by at least one (or even more) driven driving roller, wheel or cylinder which conveys the wood workpiece supported by a machine table or a roller conveyor. Exactly for the feeding movement of the workpiece such an arrangement is an advantage.

In a preferred embodiment a supporting beam is provided which also carries the driving roller, respectively wheel or cylinder. In this example the supporting beam also takes over the driving motor for the driving roller. Such an embodiment allows in the case of repair a quick replacement action of this structural component. Another advantage, however, is the fact that the supporting beam is supported seesawing or rotatable, in particular centered around an axis horizontally or even rectangular orientated to the conveying direction. By means of that it is guaranteed that the conveying unit, respectively the driving roller always sits, safely and reliably, close to it, even when the thickness of the workpieces are different.

Conveniently here the supporting beam extends parallel to the conveying direction. Preferably here the respective ends of the supporting beam are provided with driving rollers, wheels or cylinders.

Furthermore in a variant of the invention a supporting beam is provided which carries on one end a driving roller, wheel or cylinder, the supporting beam being supported seesawing, respectively rotatable, on the other end around an axis orientated horizontally or rectangular to the conveying direction. Such a conveying system can be, because of the rotatable support of the different height of the workpieces, adapted without any problems and even independently.

In another variant it is suggested that two supporting beams are provided which are independent from each other. They are cleverly arranged here on a common rotational axis and, according to the requirement, used one after the other for the transport of the wood workpiece.

In a preferred embodiment of the invention it is provided that the machining aggregate has at least one tool which can be moved, respectively positioned, along an axis which is preferably rectangular to the conveying direction of the conveying system, and during the machining an overlapping of the movement of the wood workpiece (by means of the conveying system) with the movement of the tool is provided. Usually the tool can move toward or away from the workpiece in order to bring the tool into engagement with the workpiece and to release it again. As a rule the movements along two or more axes of the tool will be provided in the machining aggregate. The movement of the wood tool along these two different axes (that may be toward the workpiece and away or rectangular to the conveying direction and the above mentioned axis) allows the carrying of corresponding paths and even to provide diagonal millings and the like. By means of that a machining installation designed according to the invention gains an enormous flexibility and applications, while the space requirements of such an installation are low, which is an additional advantage.

Conveniently here the tools are arranged on a tool sledge. A guide is provided which holds the tools sledge-like. The sledge has here a corresponding tool drive and a device which allows a simple and quick exchange of the tools.

The invention is not only limited to a machining installation, respectively the method for machining wood workpieces as described, but it also extends as well to a machining aggregate which, if necessary, can be used preferably in a machining installation, however, can also show the advantages according to the invention independently from a machining installation.

The machining installation here serves for the machining of wood workpieces, wherein according to the invention it is suggested, that the machining aggregate has at least two different tools, a first tool being supported above the wood workpiece and a second tool beneath the wood workpiece. Such a combination of several different tools in one aggregate leads also in an application independently from the use of a machining installation to a considerable saving of space as with one machine, for example, milling machinings as well as sawing machinings can be carried out. However, exactly the use of such a machining aggregate in a machining installation results in corresponding advantages. The machining aggregate can be, as shown, also used, however, as a workshop machine (without conveying system).

In the state of the art the tool engages from one side to the wood workpiece. Often here the tool is lead toward the workpiece from below. In the state of the art further tools are put up in independent aggregates along the conveying path which is space consuming. However, exactly the arrangement of tools above the workpiece allows a considerable saving of space as a second aggregate can therefore be saved in a simple manner.

Preferably saws or cutting, respectively chip removing, tools like milling cutters, end-milling cutters, solid cylindrical cutters, drilling units or planing spindles are used as tools in the wood working. Furthermore also marking, respectively inscribing tools, count as tools which are, for example, useful for bonding. Naturally also the use of special tools is possible. The invention is flexible with regard to the arrangement of the tools. It is, for example, possible to arrange the saw blade above or below the workpiece and to arrange the second tools in opposition to it, for example milling cutters, end-milling cutters or even other special or particular tolls on the upper side. By means of a corresponding arrangement of the tools constructive length is saved on the machining aggregate which is an advantage for an optimal use of space in a workshop. However, simultaneously this is combined even with an increasing of the accuracy in the machining. As in the region of the tools a guide of the wood workpiece is not possible, it is an advantage if the lengths where the wood workpiece is not guided are as short as possible. Naturally, this aim is reached by a machining aggregate which is as space saving as possible. By means of the suggestion according to the invention therefore two independent advantages are achieved.

In an advantageous embodiment of the invention it is provided that the tools, in particular the saw blade, machines the wood workpiece from above. Cut-off blocks or cuttings therefore fall automatically downwards and do not impede the use of the tools.

It is in particular an advantage here that the different conveying systems are designed in such a way that they engage in the machining aggregate and even still there try or actually reach a guide of the workpiece. For example, the cylinder of the first conveying system is approached as close as possible to the machining aggregate, the tongs-like gripper of the second conveying system can engage into the machining aggregate.

In an embodiment according to the invention it is proposed here that the first and second tools are, each independently from each other or coupled together, movable along at least one axis and can also be positioned in a controlled way. Exactly, if it is desired in the connection with the use of a machining aggregate according to the invention in the machining installation also according to the invention, that corresponding path carryings are possible, for example in order to provide diagonal machinings, it is convenient if even the tools are correspondingly movable and can also be positioned in a controlled way. The control provides here that there is, according to the desired path, a suitable controlled overlapping of the speed components of the advance of the respective conveying system (the first and the second conveying systems) and the motion drives of the tool.

If several tools are used there is a possibility in that to realize for each tool its own axis of movement with the corresponding drives. Another possibility is to mount, for example, the tools which engage in opposition (that is above and below with regard to the wood workpieces) together to a frame embracing the wood workpiece and to move this frame by a drive. Such an arrangement saves a separate drive of the tools. Such a design is particularly advantageous when not only two tools should be used but a third and fourth one at the respective sides of the wood workpiece. By means of that the axes of movement are used double.

Besides this movement coupled together it is, naturally, also possible to move the separate tools also independently from each other, for example in the frame of a portal-like, star-like or stanchion-like arrangement.

The machining aggregate can provide without any problems a machining along a third, fourth, fifth axis, wherein then besides translator axes, for example, rotational axes (inclining or turning axes) exist as fourth or fifth axis. Eventually this will lead to a swivelling, respectively a turning, of the tool. Here the axes may be orientated horizontally and/or vertically, arranged parallel or rectangular to the conveying direction.

The tool located above the workpiece as well as the tool located below the workpiece can be rotated or inclined here accordingly. Here the invention leaves it open whether both tools and only one tool have a corresponding movability around several axes.

It is an advantage if the tools are supplied in a tool magazine, in particular the second tools in a tool revolver supported rotatably. By means of the use of a tool revolver in which the tools are supplied already mounted onto driving spindles set-up times are saved. Alternatively it is, of course, also possible to supply the tools out of a tool magazine, if necessary also out of a revolver tool magazine or the like, and to replace them on demand. Both options are possible according to the invention.

It is, for example, provided that by means of the second tool a milling machining is carried out below the wood workpiece. For different milling jobs here a plurality of different milling cutters like end-milling cutters, solid cylindrical cutters, chain mortising devices, slot cutters, different saw blades, special tools and the like are provided. Additionally also a drilling machine or drilling unit can be arranged in the revolver head. By means of such an embodiment a high flexibility is reached and the space in a machining aggregate is used at its best. The arrangement of a revolver tool magazine is not limited here to the region below the wood workpiece, it can, of course, also be arranged above or on the side of the wood workpiece.

Furthermore the invention does not only comprises a machining aggregate, a machining installation and a method as described above, but it also comprises a conveying system, in particular for a machining installation, the conveying system serving for a conveying and, if necessary, also positioning of the wood workpiece and the conveying system having a coupling unit, respectively positionings, which can traverse along a guide line.

As coupling units serve, for example, spikes pressed into the wood workpiece, spike slabs or pressed-on rubber slabs and the like. Eventually a connection as slip-free as possible, preferably non-positive and/or positive between the conveying system on the one hand and the wood workpiece on the other hand has to be established. However, if the front end of a wood workpiece which has to be gripped is still in the machining aggregate and does not reach over the discharge side, it is convenient to offer a coupling element which is able to engage into the machining aggregate and pulls it out.

The invention proposes that the coupling unit comprises two tongs parts which co-operate, at least one of them being designed flexibly and both tongs parts gripping the wood workpiece from above and below. Just when the machining aggregate is designed like a portal such a design allows that the coupling unit drives from the front to the front end of the wood workpiece and grips and guides it. For that purpose it is convenient if the tongs parts are designed longish and extend parallel to the conveying direction.

As the tongs parts eventually serve for a non-positive and/or positive connection with a wood workpiece it is convenient that they co-operate either non-positive and/or positive with the wood workpiece. It is proposed here that the tongs part is designed jaw-like or even cutter-like, depending on the required non-positive or also positive interlocking.

Further preferred embodiments of the invention are described in the sub-claims.

BRIEF DESCRIPTION OF THE DIFFERENT VIEWS OF THE DRAWINGS

The invention is shown schematically in the drawing. In the drawings:

FIG. 1 a side view of the machining installation according to the invention and

Figure 2:
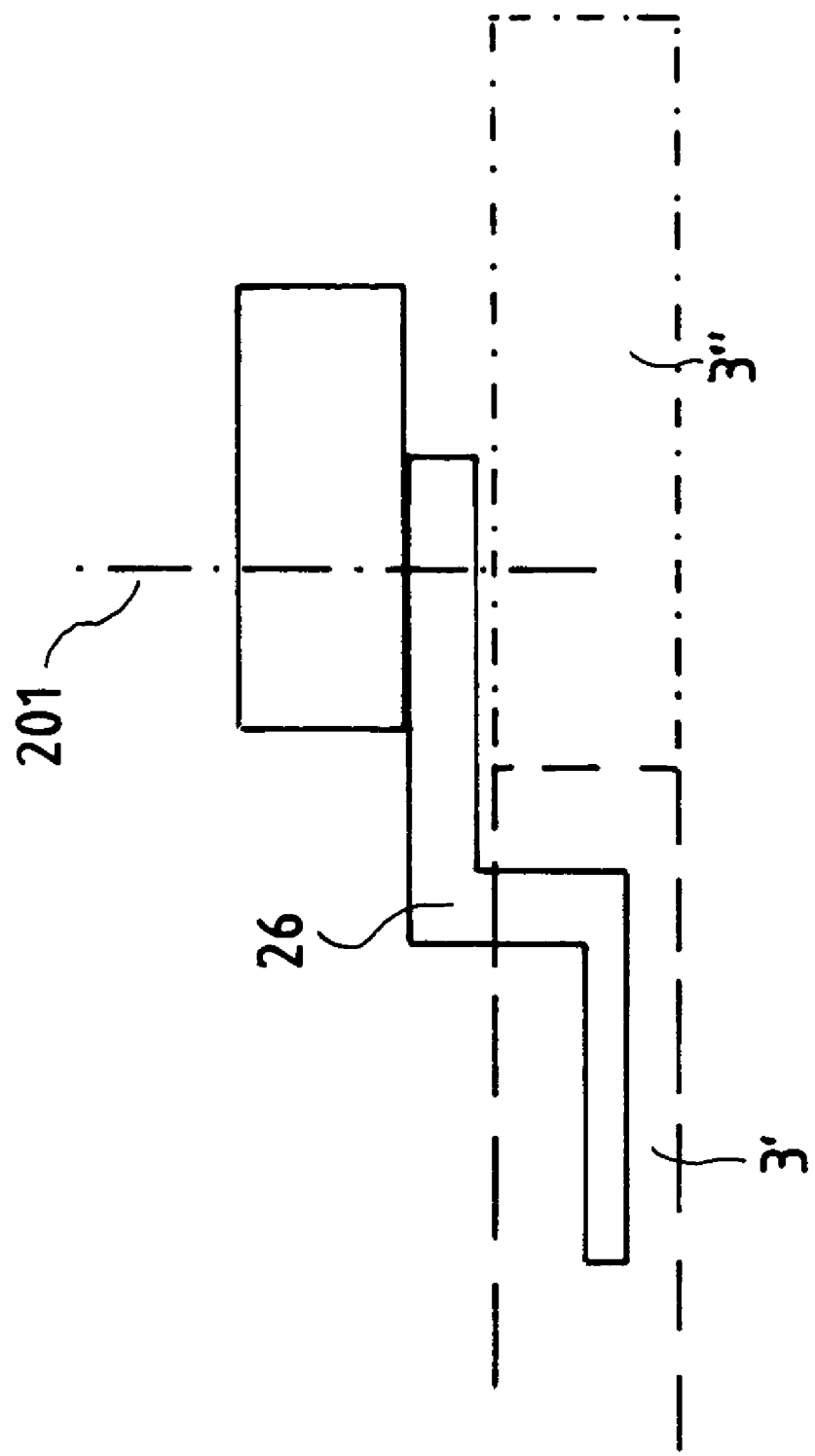

FIG. 2 a detail of the machining installation according to the invention.

DETAILED DESCRIPTION OF THE PREFERRED EMBODIMENT

FIG. 1 shows a machining installation according to the invention. The supply 90 is located on the left hand side of the machining aggregate 4, the discharge region 91 is on the right hand side of it.

In the supply region 90 a first conveying system 1 is provided. It serves for conveying a wood workpiece 3, as indicated, from the left hand side into the machining aggregate 4. The movement of the wood workpiece 3 is indicated with the double arrow 30.

Here the machining aggregate 4 does not only take over a machining of the front end region 31, but it serves also for providing further machinings on the wood workpiece 3' indicated by dashed lines.

On the discharge side 91 the second conveying system 2 is located. It is obviously designed differently compared with the first conveying system 1, however, the invention is not restricted to that. It is of course possible to use on both sides of the machining aggregate conveying systems which work similarly and/or are constructed in the same way.

The second conveying system 2 comprises a guide line 21 in which the coupling unit 20 can traverse. The coupling unit 20 is also indicated as positioning carriage. These two terms are equally in the sense of the application. The traverse is indicated by the double arrow 22. The coupling unit provides a positive and/or non-positive interlocking with the wood workpiece 3'.

The first conveying system 1 is equipped with driven driving rollers 10, the wood workpiece 3 being supported, for example, by a machine table or a roller conveyor. In such a way the wood workpiece 3 is conveyed. It is convenient here if the conveying unit 1 which acts on the wood workpiece 3 from above is designed height-adjustably in order to be adjusted to the different thickness of the wood workpiece 3 with regard the conveying effect. Advantageously, for example, a corresponding vertical guide is arranged, or the supporting beam 12 which carries the driving rollers 10 is suspended seesawing or rotational (see arrows 13), guaranteeing that at least one driving roller 10 is in engagement with the wood workpiece 3. It is also possible to use endless conveyors, for example chain conveyors and the like.

In FIG. 1 even another embodiment is shown with dashed lines. Two driving beams 19, 19' are provided which have on their ends a driving roller 10'. The two driving beams 19, 19' are supported rotatable around the rotational axis 18, respectively seesawing. This axis is supported horizontal, respectively rectangular, to the conveying direction 30.

If necessary it is also possible to convey the wood workpiece 3 backward, if this is an advantage for a machining step.

As the two driving beams 19, 19' are independent from each other they can be used one after the other or only single. It has been found here that this arrangement is also convenient for the conveying of stacks of boards as the friction of the individual boards among each other is so large that a continuous transport results.

It is an advantage if at least one, preferably both conveying system(s) have a positioning system with a corresponding measuring equipment. Of course, the positioning system here comprises the possibility to convey the wood workpiece 3 as well as means for recognizing that the desired position has been taken. Usually this is achieved by means of a corresponding normalization or initialization at the beginning of the workings and a path measuring, determining the relative position of the positioning system with regard to the indexing point, initiation point or normalization point and making by means of that also the position of the wood workpiece 3 on the means of that also the position of the wood workpiece 3 on the machining installation exactly definable. It is, for example, provided that the measuring equipment is formed by measuring wheel 11 which rolls off on the wood workpiece. This means that the measuring wheel is a part of the measuring equipment belonging to the first conveying system 1.

In FIG. 1 two variants of the arrangement of the measuring wheel 11, 11' are shown. In a first variant the measuring wheel 11' (indicated with a dashed line) is located directly below the driving roller 10'. By means of that a secure contact of the measuring wheel with the wood workpiece is reached, making the measurement accordingly exact. In the other variant the measuring wheel 11 is located in the machining aggregate, as close as possible to the machining aggregate. The measuring wheel rolls off with as little slip as possible on the surface of the wood. For that purpose corresponding coatings or means for increasing the friction are provided (rubber wheel, grooves and so on).

It is an advantage if the distance between the driving wheel 10 and the machining aggregate 4, respectively the tools 41, 42 is as short as possible. The accuracy of such an arrangement is higher as the free collar, not guided region is accordingly smaller and therefore inaccuracies of the measurement can be avoided.

It is convenient here that the measuring wheel 11 is provided in the region of the machining aggregate 4 as in particular the position of the wood workpiece 3 with regard to the machining aggregate 4 is important for an exact positioning.

In particular in the second conveying system 2 the measuring equipment is realized in the guide line 21, respectively in the coupling unit 20, and sufficiently known from the state of the art.

The machining aggregate 4 is, as shown here, equipped with two tools 41, 42. The term tool has to be understood here not only as single tool but it can really comprise a group of tools or kind of tools. According to the invention a machining aggregate 4 is suggested which has at least two different tools 41, 42, a first tool 41 of them being supported above the wood workpiece 3 and a second tool 42 below the wood workpiece 3. The method according to the invention, respectively the machining installation, here does not need a machining aggregate equipped so complex, however, it is an advantage for machinings of correspondingly higher quality.

It is provided that the first tool 41 is guided portal-like 40. By means of that a movement vertical to the paper plane (Y-axis) is possible. Therefore corresponding positionings for the first tool 41 designed as a saw blade can be reached. The saw can carry out a Z-lift, it can be lowered, respectively lifted. Optionally the saw can also be rotated, respectively inclined. Also a path carrying is possible. Here the movement of the workpiece is used.

The second tool 42 is arranged in the example shown here below the wood workpiece 3. For that purpose for example a stanchion-like support is provided. The first tool 41 as well as the second tool 42 can move in vertical direction, which is indicated each time by the double arrows 43. This movement can here be carried out each time separately or even together, the invention does not determine that.

It is an advantage if the tools 41, 42 are designed in such a way that they can be rotated, respectively inclined. It is, for example, indicated that the circular saw blade 41 can be rotated around a vertical axis, the swivelling is indicated with the reference number 44.

The inclining is indicated with the reference number 45. The arrangement is exemplary shown for the upper tool 41, however, it concerns in the same way the lower tool 42.

Furthermore it is provided that the tools 41, 42, for example, can carry out a cross movement 46, here rectangular to the conveying direction 30 of the workpiece. It is also possible here to have the movement of the lower and the upper tool carried out separately from each other or coupled. In the separated embodiment a higher flexibility is achieved, however, for each movable axis a separate drive is necessary, the coupled embodiment leads to a not too convenient solution, but it uses the axis drive for two tools.

As described in the drawing the first tool 41 is designed as a saw and the second tool 42 is designed by drilling or milling tools. This arrangement is, in particular, an advantage during operation as wood pieces separated by the saw can in this variant of the invention fall down without any problems and therefore do not impede the conveying of the wood workpiece 3.

The design of the second conveying system 2 is in particular advantageous. It comprises a positioning carriage, respectively a coupling unit 20, which can shift on a guide line 21. For gripping the wood workpiece 3 the coupling unit has two tongs parts 25, 26 which co-operate. It is suggested that at least one of the tongs parts is designed movably around the rotational axis 201 (see arrow 27) and the two tongs parts 25, 26 grip the wood workpiece 3 from above and below. The position indicated in the drawing grasps the dashed indicated wood workpiece 3'. The arrangement here is chosen in such a way that the tongs parts 25, 26 can grasp the wood workpiece 3 laterally, if necessary along the complete length of the wood workpiece. By means of that the maximum length of a workpiece which has to be machined on is not limited. It is provided that the second conveying system after-grips the wood workpiece 3. For a further conveying of the wood workpiece here the tongs parts release the wood workpiece, the coupling unit traverses to another point, preferably in the direction of the machining aggregate where the tongs parts then will grip the wood workpiece again. Such a procedure is naturally possible even with a positioning carriage designed in another way. In FIG. 1 a wood workpiece 3" is shown which extends beyond the right end of the machining installation. The arrangement is chosen in such a way that nevertheless a transport as described above is possible.

It is convenient here that any path carrying is possible, that means that movements of the tools 41, 42 can be combined freely with the conveying movement, wherein the conveying movement of the wood workpiece 3 can be caused either by the first conveying system 1 and/or the second conveying system 2.

In FIG. 1 it is indicated that the tongs parts 25, 26 are designed longish and extend parallel to the direction of conveying 22. This embodiment according to the invention makes it possible that the second conveying system 2 grips the front end 31 of the wood workpiece 3 for example in the machining aggregate and can pull it out of the machining aggregate 4. Then a re-gripping can be carried out as described above.

In FIG. 2 a detailed view of the tongs part 26 is shown from above. The tongs part is angled double-T- or Z-like, the front region which co-operates with the wood workpiece 3 being supported by it, and the back region where the tongs part 26 is supported at the coupling element 20 being arranged on the side of the wood workpiece in order to avoid a collision. The tongs part 26 can be turned around the axis 201. Drives for the tongs part 26 are provided for a safe connection of the tongs part 26 with the wood workpiece.

However, if necessary, fastenings or clamps are provided, for example if a stationary machining (for example clipping) shall be carried out.

The tongs parts 25, 26 here co-operate non-positive and/or positive with the wood workpiece.

The example of a procedure of a machining installation according to the invention is as follows.

A wood workpiece 3 is put on the machining installation in the supplying region 90. The wood workpiece 3 is gripped by the first conveying system 1 and conveyed into the machining aggregate 4. The first conveying system 1 has a measuring equipment, the measuring wheel 11 which is part of it comes into engagement with the wood workpiece 3 and defines the suitable position. The wood workpiece 3 is now, for example, indexed (for example by a light barrier or the like) or conveyed to a cross saw in order to be clipped. At this point it is an advantage if the positioning system of either the first or the second or of both conveying systems is normalized, respectively initialized, as now a defined position of the wood workpiece 3 in the machining aggregate 4 is available.

Contrary to the state of the art now there is the possibility that the machining aggregate carries out additional machinings on the wood workpiece. The machining aggregate 4 may have here only one tool 41 which has, if necessary, carried out the clipping cut. Conveniently, however, the machining aggregate 4 has a plurality of different tools in order to make accordingly complex machinings possible. It is convenient here that the different tools can move along several translator axes (which shall form, if possible, a Cartesian system), and, if possible, even longitudinal machinings can be carried out while using the conveying movement of the wood workpiece. The machining installation is optimized in such a way that either the first conveying system 1 or the second conveying system 2 or both conveying systems together perform a movement and guide of the wood workpiece through the machining aggregate. The higher the number of different tools in the machining aggregate 4, the more complex machinings are possible and the shorter is the construction of the machining installation compared with corresponding machining installations with the same functions according to the state of the art, because with these every further tool group was arranged in an independent machining aggregate, in a separated place from another machining step.

After the machining has been finished the second conveying system 2 pulls out the wood workpiece 3' completely out of the machining aggregate with the help of the coupling unit 20 and deposits the wood workpiece 3 on a supporting table 92 in the discharge region 91. A pusher is provided which pushes away the wood workpiece 3 rectangular to its longitudinal extension, the pusher traversing below the conveying system 2 without collision. On a lateral pick-up table the wood workpiece 3 can be picked up. Alternatively the wood workpiece 3 is conveyed out by the first conveying system, the second conveying system is driven back again, respectively is driven toward the workpiece.

According to the invention it is provided that the conveying regions of the first and the second conveying systems 1, 2 join in the region of the machining aggregate 4 or overlap partly. Conveniently these two conveying regions of the first and the second conveying systems overlap as it is, for example, provided in the claw- or tongs-like embodiment of the coupling element 20, in order to achieve a secure passing of the wood workpiece 3 in the machining aggregate 4.

On he discharge side 91 a supporting table 92 is shown which is located considerably below the tongs parts 25. Furthermore supports 202 are shown which can be lowered (double arrow 203). The supports 202 can be removed, which causes the wood workpiece to fall down so far that the movement of the coupling element 20 is not obstructed. The supports 202 are here designed in such a way that they can be lowered, however, they can also be removed to the side in order to achieve the same result.

As soon as the wood is released, that means it is not held anymore by the tongs parts 25, 26 or, at the latest, when the discharger conveys the wood away, the coupling unit is driven back again the machining installation in order to pick up a new wood workpiece 3.

A bearing cross conveyer is provided in the supplying region 90 which supplies the wood workpieces. Usually, the wood workpieces are put on a table parallel to each other from where the wood workpieces are then conveyed into the machining installation and unmatched. For that purpose the bearing cross conveyer is provided which is designed, for example, as conveying chain.

Now, there are two variants how to convey the wood workpiece in the supply region 90.

In the first variant, this is used, for example, with comparatively large or heavy wood workpieces, one or more pulling-in devices are provided on the bearing cross conveyer where the wood workpieces are conveyed to and orientated before the pulling-in device(s) then grips the wood workpiece and pulls it in and the first conveying system conveys the wood workpiece further. The pulling-in devices are here brought into the conveying path of the bearing cross conveyer stopper-like, orientating the wood workpiece at the pulling-in device. The pulling-in devices then grip the wood workpiece and convey it into the region of the first conveying system where it is taken over then for further conveying. As a rule the machining installation has rollers in this region which allow a rolling off of the wood workpiece in the conveying direction of the conveying system. This makes the conveying of large, heavy wood workpieces easier.

In a variant of the invention it has been found that it is an advantage if the bearing cross conveyer conveys the wood workpiece to a stopper or a stopper rail, and the first conveying system is arranged in the direction of conveying of the bearing cross conveyer before the stopper, respectively the stopper rail, and the first conveying system conveys a wood workpiece further as soon as it has contact with the stopper/stopper rail. A roller conveyor in the conveying direction of the conveying system is not necessary here. Such an arrangement is, for example, an advantage with comparatively light wood workpieces, like single boards and so on.

The occurring friction force does not lead to a blocking of the conveying system. The advantage of such an arrangement is the fact that the feeding of the next wood workpieces is carried out continuously and not, first of all, a pulling-in device has to be brought in position which has to grip the wood workpiece, convey it inside, swivel it away and position it again. For example, the bearing cross conveyer approaches the wood workpieces continuously and a removed wood workpieces already releases the stopper rail, respectively the stopper, in order to bring the next, second wood workpiece in position. The speed of such a machining installation increases accordingly. It is an aspect of the invention to design the machining installation as time optimized as possible, that means to save in each machining step machining times, non-load movements and so on, in order to reach a machining as quick as possible.

It is convenient here that the width of the driving roller, driving wheel or driving cylinder is smaller than the smallest width of the wood workpiece which has to be machined on. This guarantees that only one wood workpiece is actually unmatched and pulled into the machining installation. The width of the roller is not enough to grip two wood workpieces which are parallel in contact with each other and to convey them inside.

The different objects described in the application are independent, can be used independently and seek also independent protection.

Although the invention has been described by exact examples which are illustrated in the most extensive detail, it is pointed out that this serves only for illustration and that the invention is not necessarily limited to it because alternative embodiments and methods become clear for experts in view of the disclosure. Accordingly changes can be considered which can be made without departing from the contents of the described invention.

The invention claimed is:

1. Method for the machining of wood workpieces, said method comprising providing at least one machining tool in a single work station for machining a wood workpiece, providing a first conveying system in a feeding region of the single work station for the wood workpiece, providing a second conveying system in a discharge region of the single work station for the wood workpiece, the second conveying system including a coupling unit cooperating with the first conveying system for conveying the wood workpiece, providing each of the first and the second conveying systems with a positioning system for carrying out a plurality of machining operations in the single work station on the wood workpiece by the at least one machining tool in the single work station, the positioning system for each of the first and the second conveying systems being connected with measuring equipment to index the wood workpiece during a first machining of a front end of the wood workpiece by the at least one machining tools, machining of the front end of the wood workpiece in the single work station, performing subsequent machining operations on the wood workpiece in the single work station simultaneously while the wood workpiece is constantly moving from the feeding region to the discharge region as controlled by the positioning system directing each of the first and the second conveying systems to exactly position the wood workpiece for the machining operations by the at least one machining tool, and moving the at least one machining tool along several axes in coordination with each of the first conveying system and the second conveying system to complete the machining operations as the wood workpiece moves into, through and out of the single work stations, moving the coupling unit into the single work station to engage the wood workpiece and pull the wood workpiece from the single work station.

2. Method according to claim 1, wherein each of the first and the second conveying systems recognizes, collects and indexes the wood workpiece before the machining operations.

3. Method according to claim 1, wherein the positioning systems provided for both the first and the second conveying systems in the feeding region and the discharge region, respectively, are normalized.

4. Method according to claim 1, wherein the positioning systems provided for both of the first and the second conveying systems in the feeding region and the discharge region, respectively, are synchronized.

5. Method according to claim 1, wherein said at least one machining tool includes a first machining tool above the wood workpiece and a second machining tool below the wood workpiece in opposition to each other in the single work station.

6. Method according to claim 5, wherein a third and a fourth machining tool are located on opposite sides of the wood workpiece in the single work station.

7. Method according to claim 1, wherein the coupling unit includes two tongs.

8. Method according to claim 7, wherein the two tongs grip the wood workpiece from above and below the wood workpiece.

9. Method according to claim 8, wherein the coupling unit moves towards and away from the single work station.

* * * * *

UNITED STATES PATENT AND TRADEMARK OFFICE
CERTIFICATE OF CORRECTION

PATENT NO. : 7,661,451 B2
APPLICATION NO. : 10/728773
DATED : February 16, 2010
INVENTOR(S) : Hans Hundegger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Thirtieth Day of November, 2010

David J. Kappos
*Director of the United States Patent and Trademark Office*